(12) United States Patent
Falik et al.

(10) Patent No.: US 7,240,222 B1
(45) Date of Patent: Jul. 3, 2007

(54) USING ACPI POWER BUTTON SIGNAL FOR REMOTELY CONTROLLING THE POWER OF A PC

(75) Inventors: Ohad Falik, Kfar Saba (IL); Ilia Stolov, Holon (IL)

(73) Assignee: National Semiconductor Corporation, Santa Clara, CA (US)

( * ) Notice: Subject to any disclaimer, the term of this patent is extended or adjusted under 35 U.S.C. 154(b) by 358 days.

(21) Appl. No.: 10/375,929

(22) Filed: Feb. 27, 2003

(51) Int. Cl.
*G06F 1/00* (2006.01)
*G06F 11/30* (2006.01)

(52) U.S. Cl. .................................... 713/300; 713/340
(58) Field of Classification Search ................... None
See application file for complete search history.

(56) References Cited

U.S. PATENT DOCUMENTS

| | | | |
|---|---|---|---|
| 5,664,203 A * | 9/1997 | Hong et al. ................ 713/323 |
| 5,867,718 A * | 2/1999 | Intrater et al. .............. 713/323 |
| 6,065,121 A | 5/2000 | Hobson et al. |
| 6,098,174 A * | 8/2000 | Baron et al. ................ 713/300 |
| 6,122,748 A | 9/2000 | Hobson |
| 6,205,547 B1 | 3/2001 | Davis |
| 6,968,466 B2 * | 11/2005 | Bolian et al. ............... 713/300 |
| 2004/0025064 A1 * | 2/2004 | Felsman .................... 713/300 |

\* cited by examiner

*Primary Examiner*—Rehana Perveen
*Assistant Examiner*—Stefan Stoynov

(57) ABSTRACT

In a computer system that includes processing, memory and I/O modules and ACPI for outputting an ONCTL signal to a power supply unit. The power supply is configured to output a power off signal indicative of power off state and power on signal indicative of power on state. There is provided an embedded controller coupled to the ACPI and to the power supply unit. The embedded controller includes input for receiving a shut off event and in response to the shut off event, feeding to the ACPI a controller power off signal as long as the power supply is in power on state.

18 Claims, 4 Drawing Sheets

USING ACPI POWER BUTTON SIGNAL FOR REMOTELY CONTROLLING THE POWER OF A PC

FIELD OF THE INVENTION

This invention relates to the field of power on/power off of computer systems.

BACKGROUND OF THE INVENTION

Power on and off functions of computer systems, such as the stand-alone PC, is normally implemented through an external power switch, which controls the PC switching on and off functions by means of appropriate circuitry in a rather straight forward manner. In more complicated systems such as server computers, power on and off switching as well as a series of power off/power on operations (referred to as power cycling) are implemented in a more sophisticated manner, using a so-called Advanced Configuration and Power Interface Specification ACPI (see http://www.teleport.com/acpi), and a state machine circuitry that follows the ACPI state transition rules (for short ACPI state machine). The ACPI provides a standard way for managing computer systems specifically focused on items relating to power management of the computer system. ACPI defines various power states of the system as a whole and of sub-modules/functions in it, the rules of transition and the interface used for implementing it. Part of the power transition mechanism is the power switch. Server systems also utilize an embedded controller unit (e.g., the so-called BMC - Baseboard Management Controller -see IPMI specifications -http://developer.intel.com/design/servers/ipmi/spec.htm which, inter alia, reports to a remote console the status of the Server and enables the remote console to control designated functions in the server, such as remote power cycling and others. Modern server system combines the two functions of ACPI and remote manageability through BMC. A typical server system employing a remote power cycling mechanism is depicted in FIG. 1. Thus, FIG. 1, illustrates a system (100) CPU (2) coupled to North Bridge module (3), which, in turn, is coupled to system memory (4), Graphics controller (5) and South Bridge (6) which accommodates ACPI state machine unit (7). The architecture and operation of the various modules of the system (100) is generally known per se and therefore will not be further expounded upon herein. As is generally known per se, when the ACPI is in a state that signifies an internal state of the system (100) that requires the system to be powered on in response to one or more wake events (e.g., power button pushed, real-time clock wake, modem ring etc), the ACPI state machine asserts to a low level its power supply control output (ONCTL#). The ONCTL# signal (7) (having "0" logic level) is fed to OR gate (8) which has its other input being low (the usage of this other input is to be discussed later), and the resulting signal (9) is fed to the power supply module (10) which, in a known per se manner, will turn the system on by starting the main power rail of the system. When the assertion of power on all its outputs, the 'power-good' output of the power supply indicates that by becoming active a shut down of the system may be triggered for various reasons. The shut down operation is normally handled by the CPU to make all preparations for consistent system bring down and then, via a write operation, commands the ACPI state machine to switch to the appropriate power state (e.g., S5) and de-assert the ONCTL# signal to a '1' logic level. In response to the input '1' logic level, the OR gate output goes to high level that is fed to the power supply module which, in turn, removes power from the various power rails and de-asserts the 'power-good' output. Note that this shut down will work only if the CPU is active. In case of a fail that prevents the CPU to handle the shut down process, pushing the power button for a period of 4-seconds will cause the ACPI state machine to turn the system off (to S5) by de-asserting (1) the ONCTL# output.

The system has various fault detection-mechanisms such as the 'crow-bar' which checks that the ONCTL# command, the ACPI state machine output and the power supply response to it are all consistent. In case of a failure, a lockdown of the system may be initiated until an operator operation is done (e.g., unplug the machine from the wall power).

The self triggering power shut-down through the ACPI module has known important advantages, however, it does not satisfy a fundamental need, i.e. applying a power shut-down (or power cycling) through an external event such as a command received from a remote consol through a LAN or modem. Such an external triggering event is normally required in order to enable an operator to initiate a power shut down (or power cycling) w/o physical access to the computer. To this end, and as shown in FIG. 1, a power shutdown in system 100 may also be triggered by means of pressing the power button (11) and feeding the signal directly to the ACPI module through input (12'). The latter, in turn, will initiate the power shut-down in the manner described above.

There are circumstances where the operation of the external power shutdown (power cycling) function through the power button (11) should be selectively inhibited (to prevent accidental touch of the button) and/or the triggering shut down or power-on by a command received from a different source (e.g. remote command from a LAN (13) or external sensor (14)). By this mode of operation the power button input is fed to an embedded controller (say, BMC module (12)). Depending upon the desired mode of operation the BMC module will either degenerate the operation of so pressed power button switch, or in alternative mode, in response to activating the power button switch, an appropriate ("1") signal ('13') is generated and fed to OR gate (8) which, in turn, produces an ONCTL# signal that triggers the power shutdown. Later the signal is released ('1') for the system to turn on again. Using the BMC module has the following advantages: (i) it can selectively disable/enable the operation of the power button switch upon remote commands; (ii), other sources for initiation of the power off functions (such as remote command through LAN (13) or external sensors (14)) are supported.

Note, however, that this mode of operation (i.e. using an embedded controller to directly control ONCTL#) has an inherent limitation in that the ACPI module is not "aware" that a power shutdown has occurred leaving, thus, the system in an inconsistent state where, on the one hand, a power shutdown or power cycling has been initiated and, on the other hand, the system state, as reflected in the ACPI state machine, is not aware of the power cycling/power shutdown operation. Such an inconsistent situation may cause a system fault such as the craw bar described above. Also, it prevents the system from executing the proper shut-down sequence which may result in loss of data or corruption of file system state.

There is, thus, a need in the art to provide for a power cycling/power shutdown function which enables, whenever required, to selectively disable the operation of the external power button whilst maintaining a consistent system state as reflected by the state machine (such as the ACPI).

SUMMARY OF THE INVENTION

The invention provides: in a computer system that includes a processor, memory and a state machine that controls the power-state of the computer system by outputting a signal to at least one power supply unit, the power supply is configured to output at least a power good signal indicative of output power state as either power on or power off, an embedded controller coupled to the state machine and being responsive to at least one of said power good signal, comprising:

input means in said embedded controller for receiving a shut off event;

in response to said shut off event feeding to said state machine a controller power off signal as long as said power good signal is indicative of power on state.

The invention further provides in a computer system that includes a processor, memory and a state machine that controls a power-state of the computer system by outputting a signal to at least one power supply unit, an embedded controller coupled to the state machine and being responsive to at least said signal, comprising:

input means in said embedded controller for receiving a shut off event;

in response to said shut off event feeding to said state machine a controller power off signal as long as said signal is indicative of power on state.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
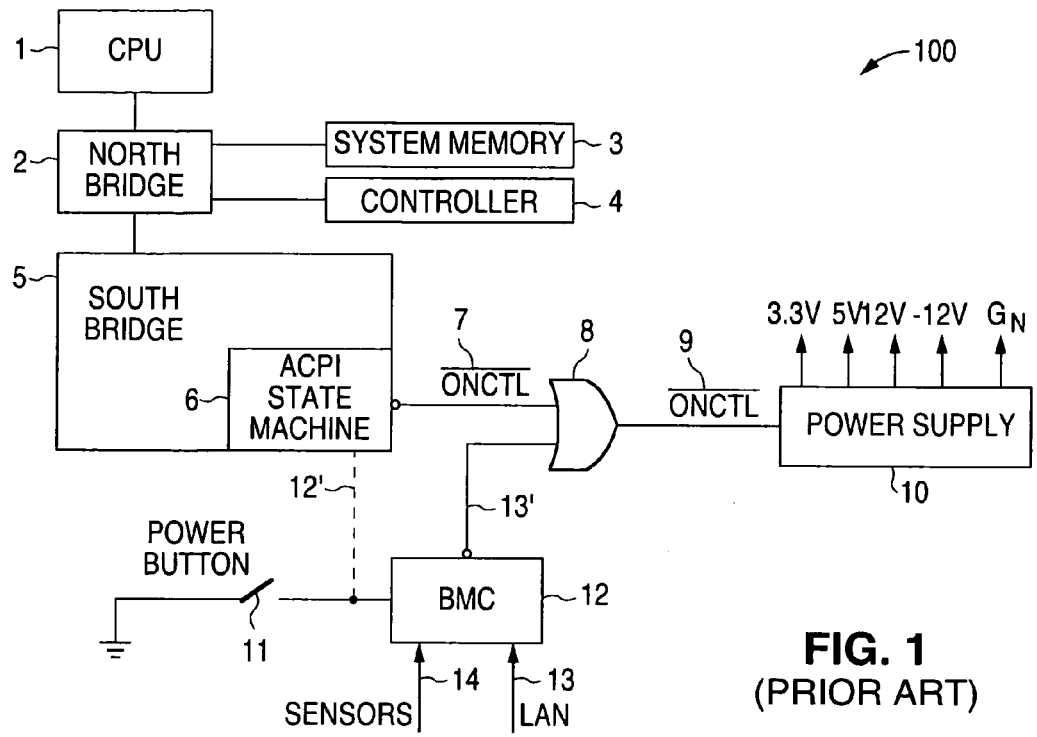
FIG. 1 illustrates a power cycling/power shut down system architecture in accordance with the prior art.
Figure 2:
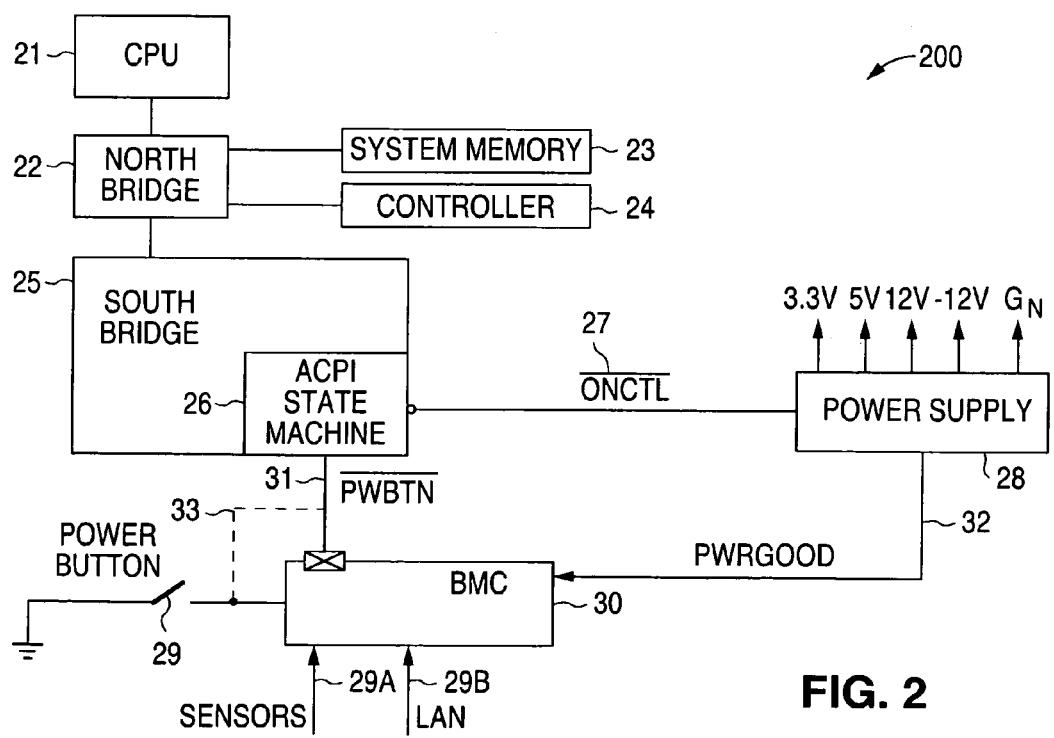
FIG. 2 illustrates a power cycling/power shut down system architecture in accordance with one embodiment of the invention.

Turning now to FIG. 2, there is shown a power cycling/power shutdown system architecture (200) in accordance with one embodiment of the invention. The structure and operation of the generally known per se CPU (21), North Bridge (22), System Memory (23), Controller (24), South Bridge (25), and ACPI module referred to also with reference to FIG. 1 will not be further described herein. The ACPI module outputs an ONCTL# signal (27) that is fed to power supply module (28) in response to the appropriate system internal state as reflected by the state machine of the ACPI (26) module. By one mode of operation, an embedded controller (e.g. BMC) outputs a "0" on its PWRBTN# output (31) that is fed to the ACPI in response to an event. Note that a sequence of "0" output and release may be used for a sequence of operations.

The event is, for example, an operation of the Power button (29), an external sensor input (29A) or LAN command (29B). Note that in contrast to the prior art where the output of the BMC (30) was fed to the OR gate (8) with the output of the ACPI state machine, in accordance with this embodiment, the output of the BMC (30) is fed directly to the ACPI state machine input.

By another embodiment, the Power button switch (29) is coupled through wired AND (33) directly to the ACPI module (26), instead of being coupled to the BMC input. A wired AND (33) can be implemented, e.g. by using an open drain driver on the BMC output and the power button (29) being able to pull the signal low when pushed. There is further provided a resistor coupled to the standby supply that will take the signal high when neither the BMC (30) nor the power button (29) drives it low.

As is also shown, a PWRGOOD feedback signal (32) is also fed to the BMC (30). The latter indicates to the BMC (30) if the Power has been shut down. The operation of the BMC (30) in accordance with this embodiment will now be explained with reference also to FIG. 3. Thus, in response to an event (41) (typically, although not necessarily, a power button (29) being pressed, a remote LAN command (29B) or sensor input (29A) in FIG. 2) the value of the PWRGOOD signal (32) is sampled (step 42). In the case that the value is "0" (indicating that the system is in shutdown state), no operation is required and the system reverts to idle state (44), awaiting an event. If, on the other hand, the value in step (42) is "1", indicating that the power is on, then a PWRBTN# signal ("0") is triggered (43) and fed to the ACPI module ((26) in FIG. 2). The latter, depending upon its operational state, will trigger an ONCTL# signal de-asserted. In the common case when the system is functional this will be done via a call to the CPU (21) that will handle the shutdown process and will give the proper turn-off command. When the system is not functional this will be done by the ACPI state machine directly after 4-seconds.

Note that in another embodiment, the BMC (30) uses the power supply on/off command (e.g. the ONCTL# signal) as indication to the power supply state instead of being responsive to the PWRGOOD. In such case the system may fail to respond directly to power supply failures, requiring, thus, supplemental means (e.g., measure the power supply outputs).

Reverting now to the previous embodiment, a sampling procedure of PWRGOOD now commences for up to 4 seconds. To this end, a counter is set (44'). If during the 4 sampling seconds a PWRGOOD signal is sampled ("0") (45) indicating that a power shutdown has occurred (implicitly suggesting that ONCTL# signal (27) in FIG. 2 was delivered to the Power Supply module (28) causing it to shut down the power), then the PWRBTN# signal "0" should no longer be fed to the ACPI module, and its state is changed to inactive "1" (46). Note that had PWRBTN# been fed to the ACPI module, notwithstanding the fact that a power shutdown had been encountered (i.e. PWRGOOD="0") this would have caused that the system will-restart as the button is released.

Reverting now to step (47), if the entire 4 sampling seconds have elapsed without sensing PWRGOOD, then, in accordance with the normal operation of the ACPI module, a power shutdown will definitely occur and the need to further sample the PWRGOOD feedback signal (32) and to feed the PWRBTN# signal (31) are obviated and accordingly, the latter signal is disabled (step 46).

By this embodiment, the net effect is, thus, that in the case that the PWGOOD signal (32) is sensed within the 4-second time interval (starting from the starting event, 29, 29A or 29B) the PWRBTN# signal (31) is then disabled, and, in the case that the 4 seconds have elapsed, the PWRBTN# signal is disabled, even if PWGOOD has not yet been sensed.

The ACPI state machine guarantees that ONCTL# is released when PWBTN# is held low for 4-second and accordingly any delay on the feedback to PWGOOD should not affect the operation.

By another embodiment, the Power Button switch (29) is coupled to the ACPI module through the wired AND connection (33). In this case, it would not be possible to disable the operation of the switch, as would be the case had the Power Button switch been coupled to the BMC module. Put differently, if the Power Button switch is operated, it feeds a shutdown signal to the ACPI (through the wired AND), irrespective of the operation of the BMC. By this embodiment, the triggering of the shutdown event through the embedded controller would only be by means of the LAN input or sensors (29A and 29B), and the sampling of the feedback signal PWRGOOD is as discussed above, with reference to FIG. 2.

Note that unlike the prior art, in accordance with the specified embodiment of the invention, the BMC is employed whilst maintaining the ACPI module in a consistent state, since the ONCTL# signal (that will lead to Power Shutdown) is produced only through the ACPI module, leaving, thus, the latter module aware of the command given to the power supply.

Figure 4A:
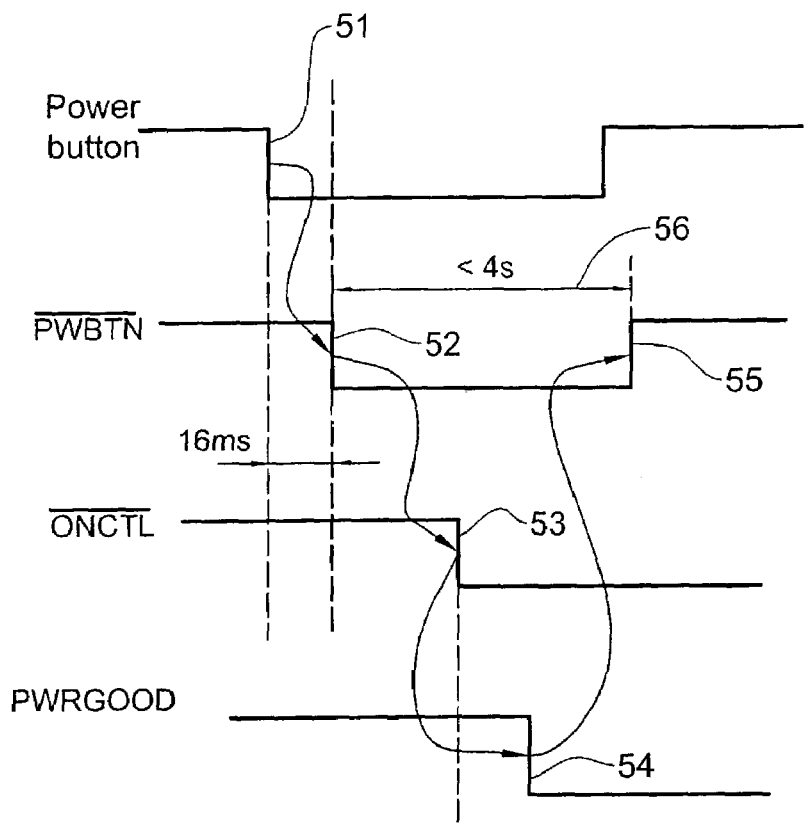
FIGS. 4A–B illustrate two timing charts that correspond to the operation of the system in accordance with the embodiment of FIG. 2.
Figure 4B:
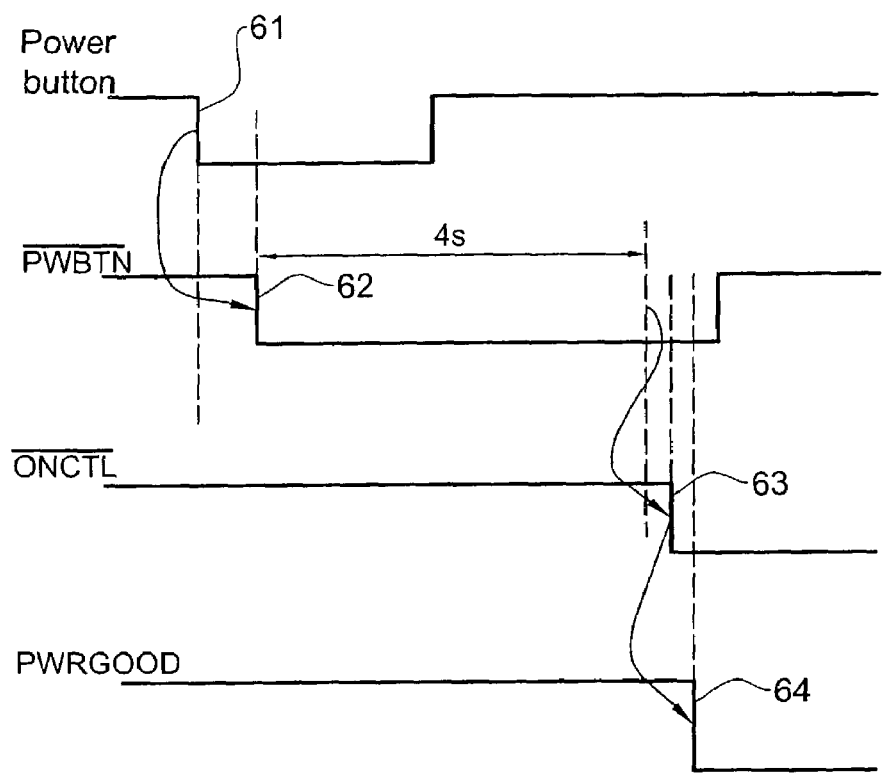

The operation as described above with reference to few non limiting embodiments is reflected in the timing charts of FIGS. 4A–B. FIG. 4A corresponds to the short power shutdown mode (less or equal to 4 seconds) and FIG. 4B corresponds to the long power shutdown mode (more that 4 seconds). Thus, in response to an event, say pressing Power button (51) [(29) in FIG. 2], the PWBTN# signal [(31) in FIG. 2] is activated (52) and shortly afterwards, the ONCTL# signal [(29) in FIG. 2] is triggered (53), giving rise to the PWGOOD signal (54) [(32) in FIG. 2] and in response thereto, to disabling the PWRBTN# signal (55). Note that the entire duration of operation of the PWRBTN# signal is less than 4 seconds (56).

In FIG. 4B, the Power Button is activated (61) and the PWRBTN# signal (62) follows suit, however, in contrast to FIG. 4A, the ONCTL# activation by the ACPI is delayed (63) and the Power shutdown (64) will occur after the elapse of the 4-second time interval.

Figure 3:
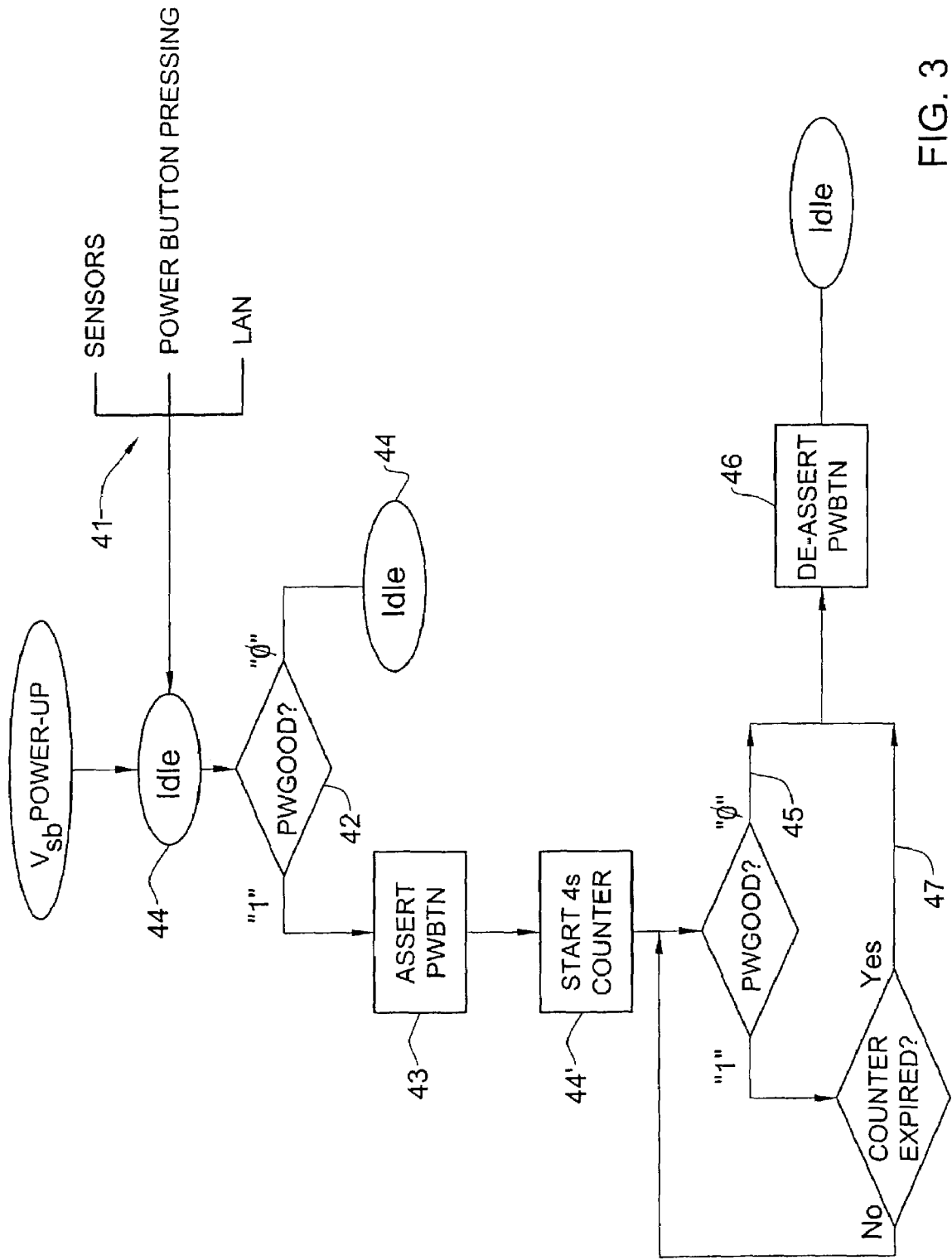
FIG. 3 illustrates a flow diagram of the operational steps of the system in accordance with the embodiment of FIG. 2.

Note that the invention is not bound by the specific architecture of FIG. 2 and the operational steps of FIG. 3. For example, the feedback may be applied utilizing the ONCTL# signal rather than the PWRGOOD signal. Obviously, the invention is not bound by the use of ONCTL and/or PWRGOOD signals.

By another example, the 4 second-time interval may be modified, depending upon the specification of the specific system that employs the technique of the invention compensating for timing differences or variation over the standard. By yet another example, other triggering events are used in addition or instead of those depicted in FIG. 2.

In accordance with an embodiment of another aspect of the invention, a Power Up mode is implemented. If the Power On mode is implemented following the specified Power Down operation, power cycling is brought about. The operation of the Power On mode will be described with reference to FIG. 2 and to the timing chart of FIG. 5. Turning at first to the mode of operation where the power button switch 29 is coupled to the BMC, in response to power on event (71 in FIG. 5) (by, e.g., any of the sources 29, 29A and 29B), the PWRGOOD signal is sensed. If it indicates that the system is already on, then no action needs to be taken. If, on the other hand, it indicates that the system is off (PWPGOOD="0"), then a pulse of PWRBTN# signal is generated for pre-defined duration (say, 0.1 seconds 72), and, in response, the ACPI asserts ("1") the ONCTL# signal (73) which gives rise to power supply output indicated by PWRGOOD going high.

If the configuration of the system of FIG. 2 is such that the Power Button is coupled through wired AND to the ACPI, then the operation of the Power On function is as described above, except for the fact that in addition to sensing the state of the PWRGOOD signal (which, as may be recalled, should indicate that the system is down), the state of the Power Button needs to be sensed in order to ascertain that it is open and not closed (the latter signifies that the system should be turned off).

Figure 5:
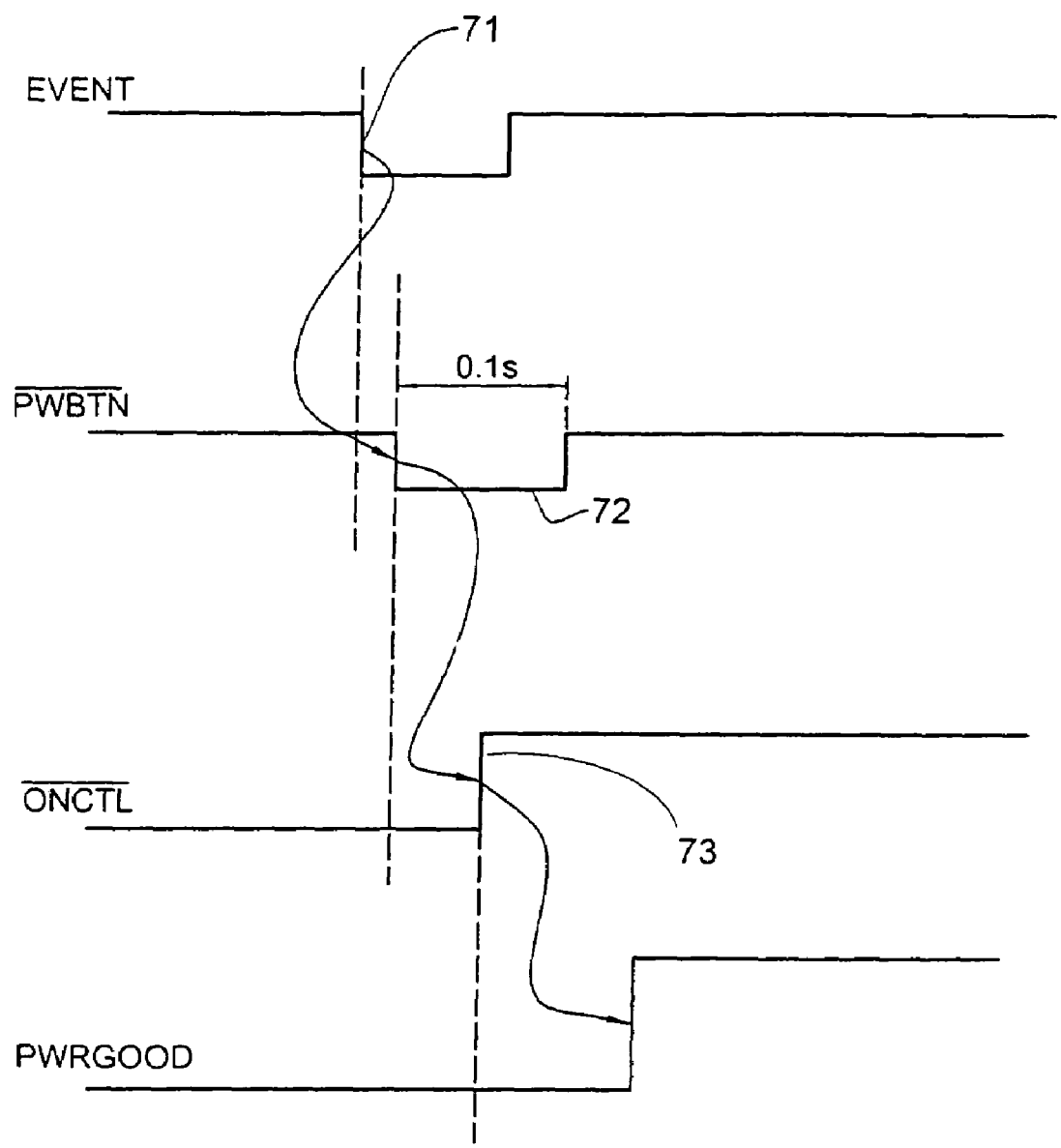
FIG. 5 illustrates a timing chart that corresponds to the operation of a power on mode of operation, in accordance with an embodiment of the invention.

The invention is not bound by the specific embodiment of the Power On function as described with reference to FIGS. 2 and 5.

Some remote command may call for an operation called 'power cycle' in this case the machine is turned off and back on again. This operation is preformed by the BMC by combining the 'turn-off' and the 'turn-on' operation with a pause of a few seconds between.

POWERGOOD may be an output indicating when the power supply power outputs are active, or may use reverse logic indicating when they are inactive. It is also possible to generate POWERGOOD via monitoring of the power supply power outputs state.

The present invention has been described with a certain degree of particularity, but those versed in the art will readily appreciate that various alterations and modifications may be carried out, without departing from the scope of the following claims.

The invention claimed is:

1. In a computer system that includes a processor, a memory, and a state machine that controls a power-state of the computer system by outputting a signal to at least one power supply unit, the power supply unit configured to output at least a power good signal indicative of an output power state as either power on or power off, an embedded controller coupled to the state machine and being responsive to at least one of the power good signal, the embedded controller comprising:

an input in the embedded controller for receiving an external shut off event; and a circuit, in response to the external shut off event, configured to feed the state machine a controller power off signal as long as the power good signal is indicative of the power on state, wherein the external shut off event originates from at least one of: a power button switch, a modem and a local area network (LAN), and wherein the embedded controller selectively disables the external shut off event.

2. A system, comprising:

a state machine operable to control a power supply unit, the power supply unit operable to generate a state signal identifying a state of the power supply unit, the state of the power supply unit comprising a power-on state or a power-off state; and a controller coupled to the state machine and operable to communicate a power-off signal to the state machine in response to an external shut-off event when the state signal identifies the power-on state, wherein the external shut off event is a remote shut-off event originating from at least one of: a power button switch an input from a sensor, a command received from a modem, and a command from a local area network (LAN), and wherein the controller selectively disables the external shut off event.

3. The system of claim 2, wherein the controller is operable to communicate the power-off signal to the state machine when the state signal identifies the power-on state and a specified time interval has not elapsed.

4. The system of claim 3, wherein the power-off signal is not communicated to the state machine when the time interval has elapsed.

5. The system of claim 3, wherein the time interval comprises four seconds.

6. The system of claim 2, further comprising a power button switch coupled to the state machine through an AND gate.

7. The system of claim 2, wherein the controller is further operable to:

receive a power-on event; and communicate a power-on signal to the state machine in response to the power-on event.

8. The system of claim 2, wherein the state machine comprises an Advanced Configuration and Power Interface (ACPI) state machine.

9. The system of claim 2, wherein the controller comprises a Baseboard Management Controller (BMC).

10. The system of claim 2, wherein the state machine forms a portion of a first bridge; and further comprising:

a processor;

a second bridge coupling the processor and the first bridge;

a system controller coupled to the second bridge; and a system memory coupled to the second bridge.

11. A method, comprising:

receiving a state signal in an embedded controller identifying a state of a power supply unit, the state of the power supply unit comprising a power-on state or a power-off state;

detecting an external shut-off event with the embedded controller received from a communication network;

communicating a power-off signal from the embedded controller to a state machine in response to the external shut-off event when the state signal identifies the power-on state, wherein the external shut-off event comprises at least one of: an activation of a power button switch, an input from a sensor, a command received from a modem, and a command from a local area network (LAN); and selectively disabling the external shut-off event with the embedded controller.

12. The method of claim 11, further comprising generating at the state machine a control signal for the power supply unit, the control signal based at least partially on the power-off signal.

13. The method of claim 11, wherein communicating the power-off signal comprises communicating the power-off signal when the state signal identifies the power-on state and a specified time interval has not elapsed.

14. The method of claim 13, wherein the power-off signal is not communicated to the state machine when the time interval has elapsed.

15. The method of claim 11, wherein a power button switch coupled to the state machine through an AND gate provides the external shut-off event.

16. The method of claim 11, further comprising:

receive a power-on event; and communicating a power-on signal to the state machine in response to the power-on event.

17. The method of claim 11, wherein the state machine comprises an Advanced Configuration and Power Interface (ACPI) state machine.

18. The method of claim 11, wherein the controller comprises a Baseboard Management Controller (BMC).

* * * * *